(12) United States Patent
Kawada et al.

(10) Patent No.: US 6,909,468 B2
(45) Date of Patent: Jun. 21, 2005

(54) POSITIONAL DIFFERENCE CORRECTING APPARATUS BETWEEN TWO-ROUTE VIDEOS

(75) Inventors: Ryoichi Kawada, Saitama (JP); Masahiro Wada, Saitama (JP); Shuichi Matsumoto, Saitama (JP)

(73) Assignee: KDDI Corporation, Tokyo (JP)

( * ) Notice: Subject to any disclaimer, the term of this patent is extended or adjusted under 35 U.S.C. 154(b) by 302 days.

(21) Appl. No.: 09/984,585

(22) Filed: Oct. 30, 2001

(65) Prior Publication Data

US 2002/0071054 A1 Jun. 13, 2002

(30) Foreign Application Priority Data

Oct. 31, 2000 (JP) ........................................ 2000-332666

(51) Int. Cl.⁷ .............................................. H04N 9/475
(52) U.S. Cl. ...................................... 348/518; 348/191
(58) Field of Search ................................ 348/180, 191, 348/705, 700, 607, 500, 184, 518

(56) References Cited

U.S. PATENT DOCUMENTS

| | | | |
|---|---|---|---|
| 5,161,247 A | | 11/1992 | Murakami et al. |
| 5,226,093 A | * | 7/1993 | Iwase ........................ 382/236 |
| 5,241,389 A | | 8/1993 | Bilbrey |
| 5,446,492 A | | 8/1995 | Wolf et al. |
| 5,530,483 A | * | 6/1996 | Cooper et al. .............. 348/518 |
| 5,574,500 A | | 11/1996 | Hamada et al. |
| 5,596,364 A | | 1/1997 | Wolf et al. |
| 5,894,324 A | | 4/1999 | Overton |
| 6,031,582 A | | 2/2000 | Nishikawa et al. |
| 6,127,950 A | * | 10/2000 | Yamauchi ..................... 341/55 |
| 6,229,922 B1 | * | 5/2001 | Sasakawa et al. .......... 382/209 |
| 6,351,281 B1 | * | 2/2002 | Cooper ....................... 348/192 |

FOREIGN PATENT DOCUMENTS

| | | |
|---|---|---|
| EP | 0 838 960 A2 | 4/1998 |
| EP | 0 967 811 A2 | 12/1999 |

OTHER PUBLICATIONS

Communication from European Patent Office dated Dec. 1, 2004 for Application No. EP 01 12 5420 enclosing European Search Report.

* cited by examiner

*Primary Examiner*—Victor R. Kostak
(74) *Attorney, Agent, or Firm*—Westerman, Hattori, Daniels & Adrian, LLP

(57) ABSTRACT

Received videos through A and B routes are inputted in first and second variable devices and then delayed by a first and a second frame memory by one frame to be inputted in a comparator. Alternatively, these signals A and B are further delayed by one frame by third and forth frame memories and also inputted in the comparator. The comparator compares the signals obtained by delaying the signals A, B, AF and BF by one line and one pixel, respectively, between the A and B routes with respect to all combinations so as to detect the difference between them. Then, a signal having the minimum difference is detected and a first and a second memory control signal to make the difference smaller are outputted to the first and second variable delay devices. By repeating the processing, a horizontal difference, a vertical difference and a time axial difference are gradually, and then completely, corrected including when the original amount of the difference is larger than a frame delay.

9 Claims, 7 Drawing Sheets

Fig. 4

| INPUT R OF DECODER 41 | A MEMORY CONTROL SIGNAL | B MEMORY CONTROL SIGNAL |
|---|---|---|
| 0 | 0 | 0 |
| 1 | 0 | D |
| 2 | 0 | L |
| 3 | D | 0 |
| 4 | L | 0 |
| 5 | 0 | F |
| 6 | 0 | F D |
| 7 | 0 | F L |
| 8 | D | F |
| 9 | L | F |
| 10 | F | 0 |
| 11 | F D | 0 |
| 12 | F L | 0 |
| 13 | F | D |
| 14 | F | L |

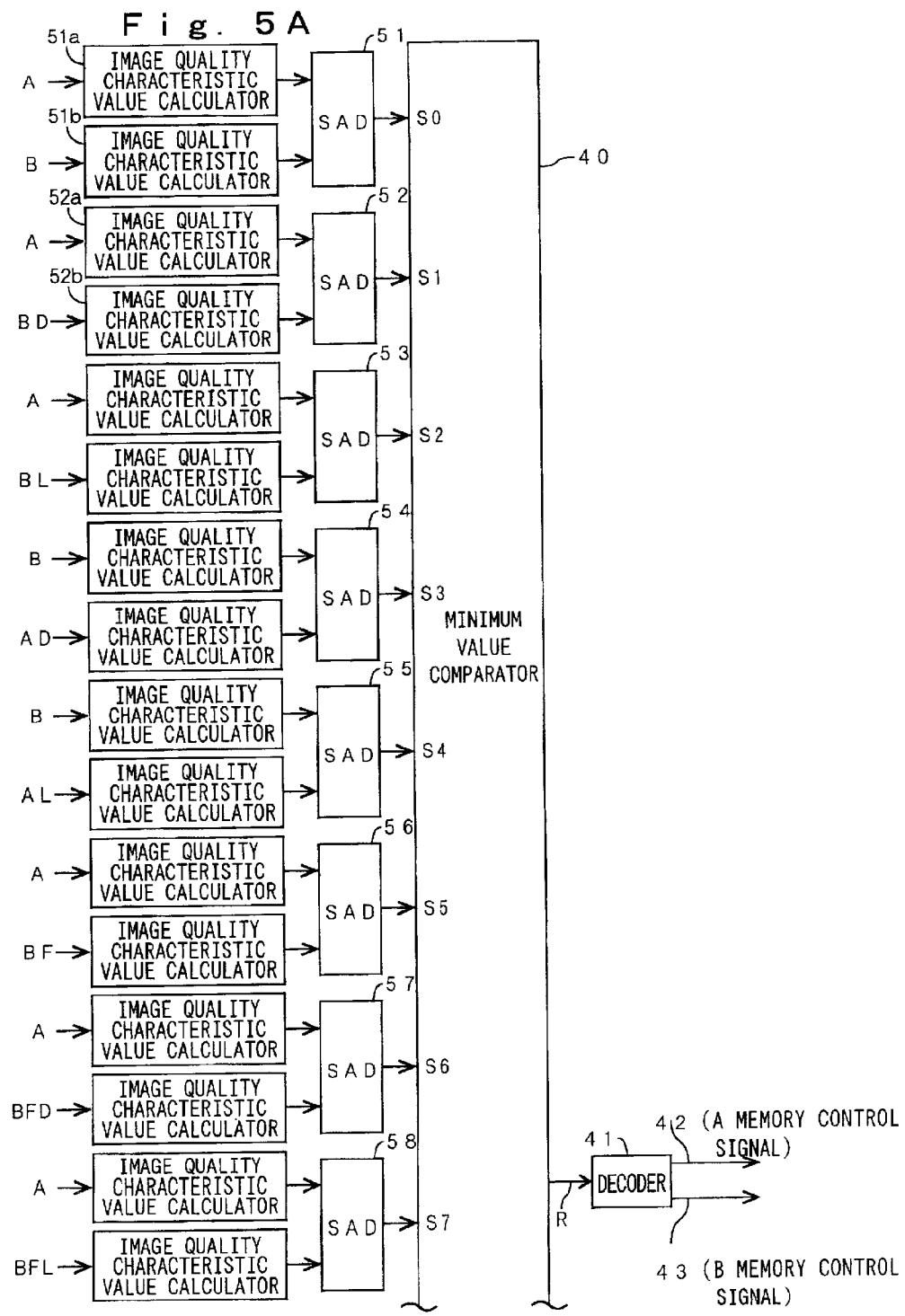

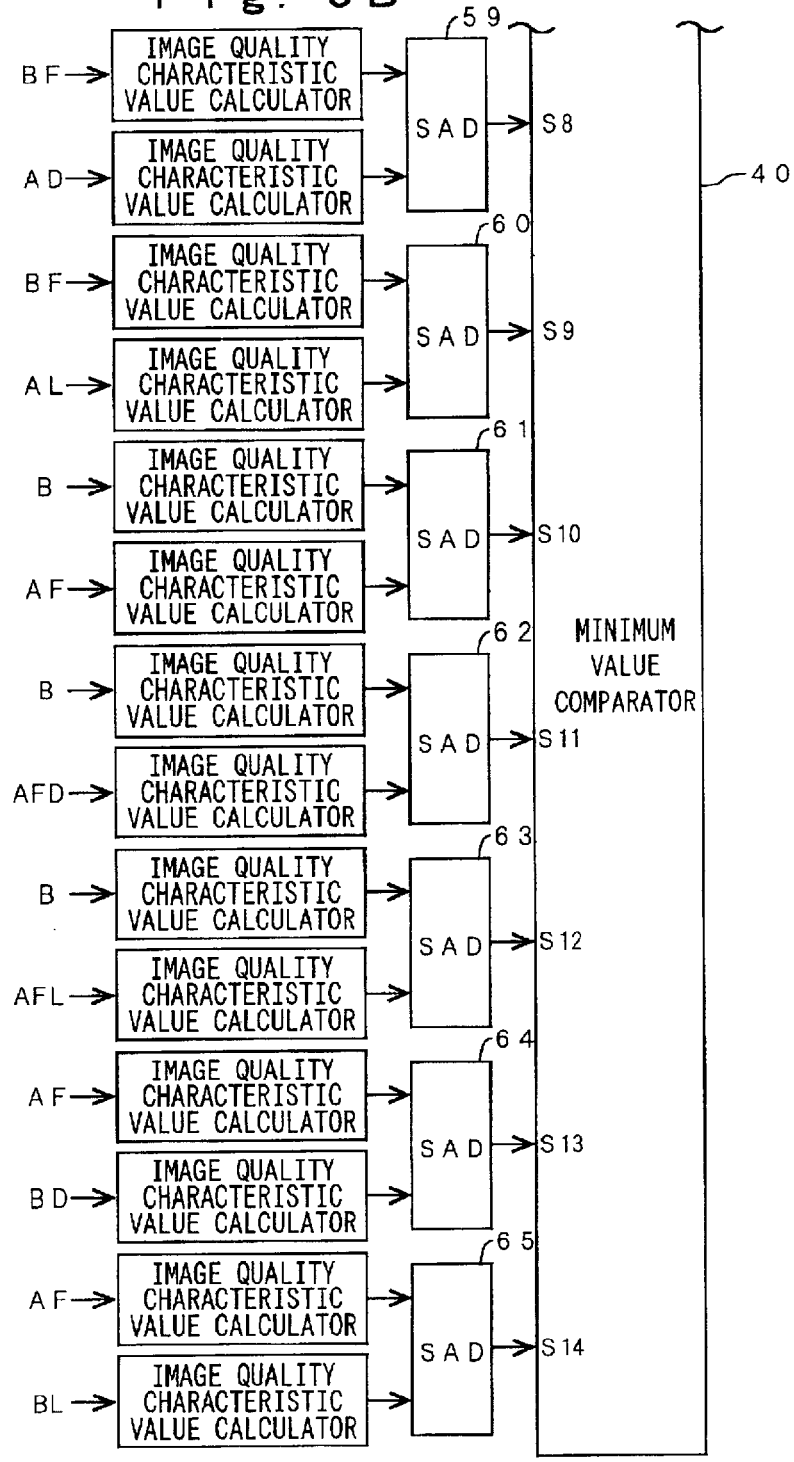

POSITIONAL DIFFERENCE CORRECTING APPARATUS BETWEEN TWO-ROUTE VIDEOS

BACKGROUND OF THE INVENTION

1. Field of the Invention

The present invention relates to a positional difference correcting apparatus between two-route videos, which is preferable to be used for a system intending to have high reliability of the transmission by transmitting the same video to two channels.

2. Description of the Related Art

Conventionally, in a double transmission of a video designed to have high reliability, a system such that the same video is transmitted with two routes or two channels and a person monitors these two-route videos at the receiving side has been performed. In the system, in this case that a failure arises in any one of the two routes, an observer of the two-route videos detects the failure and changes over a switch to a normal channel manually.

However, according to the above described conventional art, finding an image failure and changing to a normal channel depend on manpower, so that it takes a time not less than two or three seconds from the image failure arises until a switch is changed over to the normal channel. Therefore, this involves a problem such that the video having a failure has been outputted during two or three seconds.

Accordingly, the present applicant invented an apparatus to automatically find an image failure and automatically change over a switch to a normal channel and filed the invention as a patent (namely, "an image failure detecting apparatus in a redundant double transmission" of Japanese Patent Application No. 11-156432). According to the invention, in the two-route videos to be inputted in the image failure detecting apparatus, it is assumed that the positions of the videos are identical and there is no processing delay difference.

However, in the double transmission, there are many cases such that the two-route videos pass through geographically different places, so that it is common that there is a transmission delay difference. Alternatively, in this case that a sort of a transmission apparatus to be included in respective channels, for example, a sort of an image compressing coding apparatus and a decoding apparatus or the like are different, there is a possibility that a position of an available screen in each piece of video is slightly displaced in an upper or lower direction and a right or left direction (a vertical direction and a horizontal direction) depending on an apparatus. Alternatively, in this case that one of the two channels is a satellite line, there may be a difference of about one second in the transmission time of the both channels (i.e., the difference in a time axis) and there may be a video difference of about thirty pieces between the two-route videos.

SUMMARY OF THE INVENTION

An object of the present invention is to provide a positional difference correcting apparatus between two-route videos in order to remove a horizontal difference, a vertical difference and a time axial difference between the two-route videos from arising.

In order to achieve the object, the invention is characterized in that a positional difference correcting apparatus between two-route videos comprises: first variable delay means in which a received video of a first route is inputted and second variable delay means in which a received video of a second route is inputted; frame memories, line memories and pixel memories, which are connected each of the first and second variable delay means, comparing means to compare a frame delay video, a line delay video and a pixel delay video, which are delayed by the frame memories, the line memories and the pixel memories, between the first and second routes; and correcting control signal generating means to generate a control signal for correcting a minimum delay difference, which are obtained by the comparing means; wherein a signal obtained by the correcting control signal generating means is provided to the first or the second variable delay means so as to correct the delay difference.

According to the invention, a positional difference or a delay difference of the received videos between the first and second routes is corrected completely.

BRIEF DESCRIPTION OF THE DRAWINGS

FIG. 4 is a view for illustrating an example of a table, which is owned by a decoder shown in FIG. 3;

FIGS. 5A and 5B are block diagrams for illustrating another specific constitution of the correlation calculating portion;

DETAILED DESCRIPTION OF THE PREFERRED EMBODIMENTS

The present invention will be specifically explained below with reference to the drawings. At first, a principle of the present invention will be explained.

According to the present invention, a pixel value and a characteristic value of the two-route videos are compared in the inputted videos, which are slightly displaced generally. Then, by gradually correcting a difference between the positions, finally, the positions of the two-route videos are precisely aligned. There is a case that a sort of a compressing coding apparatus is different from a sort of a decoding apparatus between the channels in the two-route videos. In this case, the coded noises are different in the two channels. However, even in this case, a main original video signal is predominant, so that it can be said that there is autocorrelation in the comparison between the two-route videos.

As described above, according to a principle of the present invention, the positions of the two-route videos are gradually aligned by the use of a property such that, as the difference in the two-route videos is decreased, the correlation is gradually increased.

Figure 1:
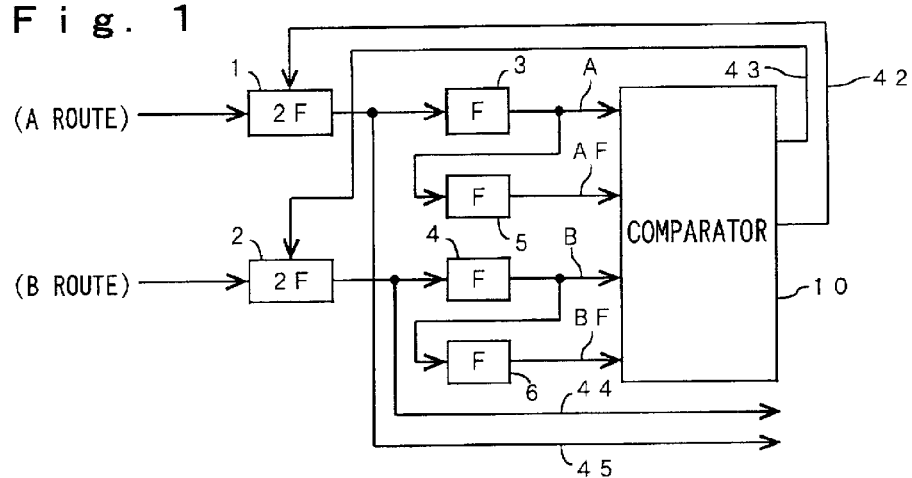
FIG. 1 is a block diagram for illustrating a schematic constitution of an embodiment according to the present invention.

An embodiment according to the present invention will be explained with reference to FIG. 1. As shown in FIG. 1, the video signals of two routes (hereinafter, they are referred to a A route and a B route, respectively) are inputted in a first FIFO-type frame memory 1 and a second FIFO-type frame memory 2 as one of variable delay means, which are capable of changing a reading position, respectively. As one example, these memories 1 and 2 preferably have a storage capacity for two frames. However, they are not limited to this and a memory having larger storage capacity than this may be used. These memories 1 and 2 are connected to a third frame memory 3 and a fourth frame memory 4. Then, the signals read from these memories 1 and 2 are inputted in the third frame memory 3 and the fourth frame memory 4, respectively. The third frame memory 3 is connected to a comparator 10 and a fifth frame memory 5. On one hand, the fourth frame memory 4 is connected to the comparator 10 and a sixth frame memory 6. Therefore, a signal outputted from the third frame memory 3 is inputted in the comparator 10 and the fifth frame memory 5 and a signal outputted from the fourth frame memory 4 is inputted in the comparator 10 and the sixth frame memory 6. From this, it is obvious that the third to sixth frame memories 3 to 6 generate the delay for one frame, respectively.

A specific embodiment of the comparator 10 will be described with reference to FIG. 2 as a reference symbol A denotes an output signal of the third frame memory 3, a reference symbol B denotes an output signal of the fourth frame memory 4, a reference symbol AF denotes an output signal of the fifth frame memory 5 and a reference symbol BF denotes an output signal of the sixth frame memory 6 in FIG. 1.

The comparator 10 is configured by 1-pixel delay portions 11, 13, 15 and 17 for delaying the output signals A, AF B and BF by one pixel, one line delay portions 12, 14, 16 and 18 for delaying the output signals A, AF B and BF by one line and a correlation calculator 19.

In the correlation calculator 19, six sorts of the signals with respect to the A route including the output signals A, one pixel delay signal AD of the signal A, one line delay signal AL of the signal A, one frame delay signal AF of the output signal A, one pixel delay signal AFD of the signal AF and one line delay signal AF of the signal AF are inputted. Further, in the correlation calculator 19, six sorts of the signals with respect to the B route including the output signal B, one pixel delay signal BD of the signal B, one line delay signal BL of the signal B, one frame delay signal BF of the output signal B, one pixel delay signal BFD of the signal BF and one line delay signal BFL of the signal BF are inputted.

Figure 3:
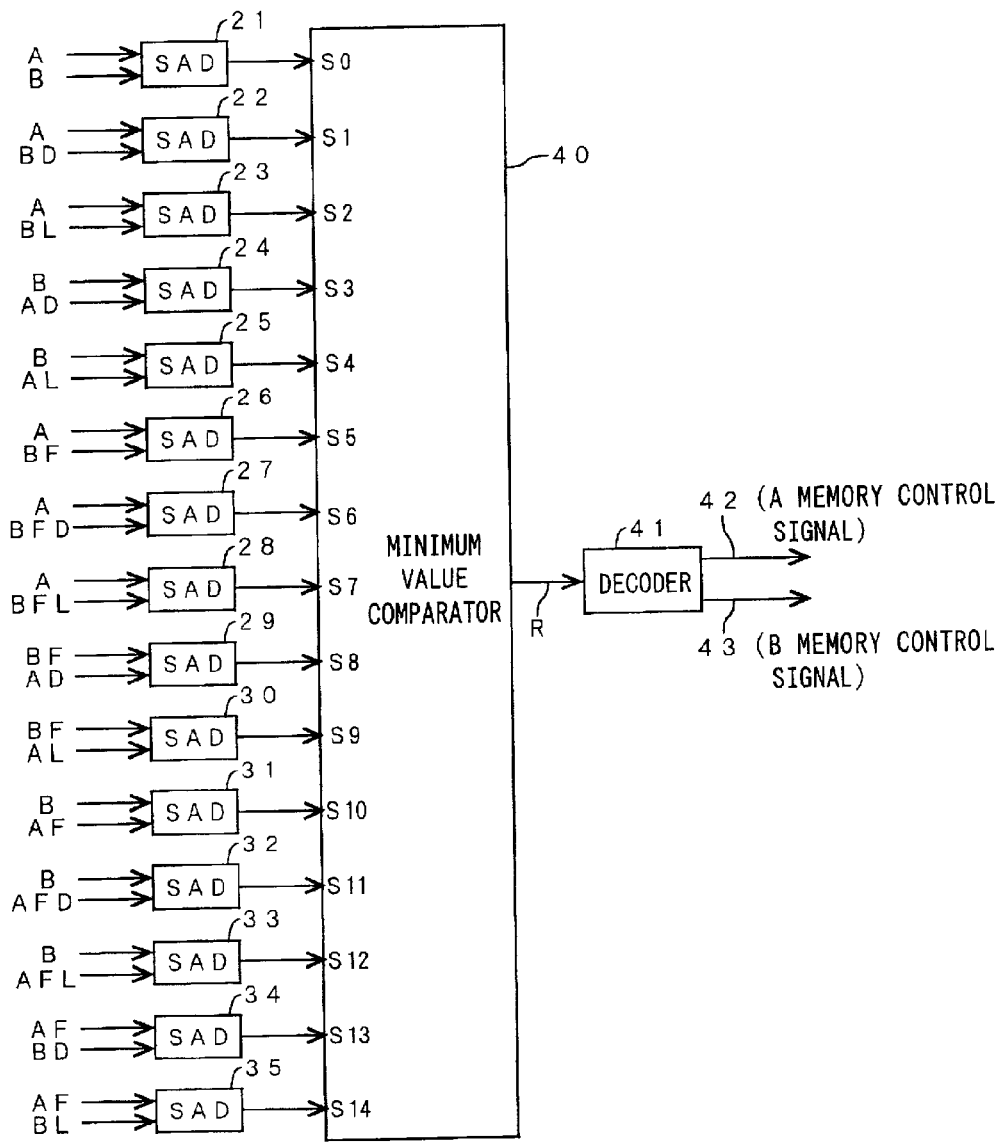
FIG. 3 is a block diagram for illustrating a specific constitution of a correlation calculating portion in FIG. 2.

A specific embodiment of the correlation calculator 19 will be explained with reference to FIG. 3. The correlation calculator 19 is configured by pixel value difference absolute value sum calculators (SAD) 21 to 35, a minimum value comparator 40, in which respective outputs of these pixel value difference absolute value sum calculators 21 to 35 are inputted, and a decoder 41 to output memory control signals 42 and 43 by decoding the output R of the minimum value comparator 40.

Figure 2:
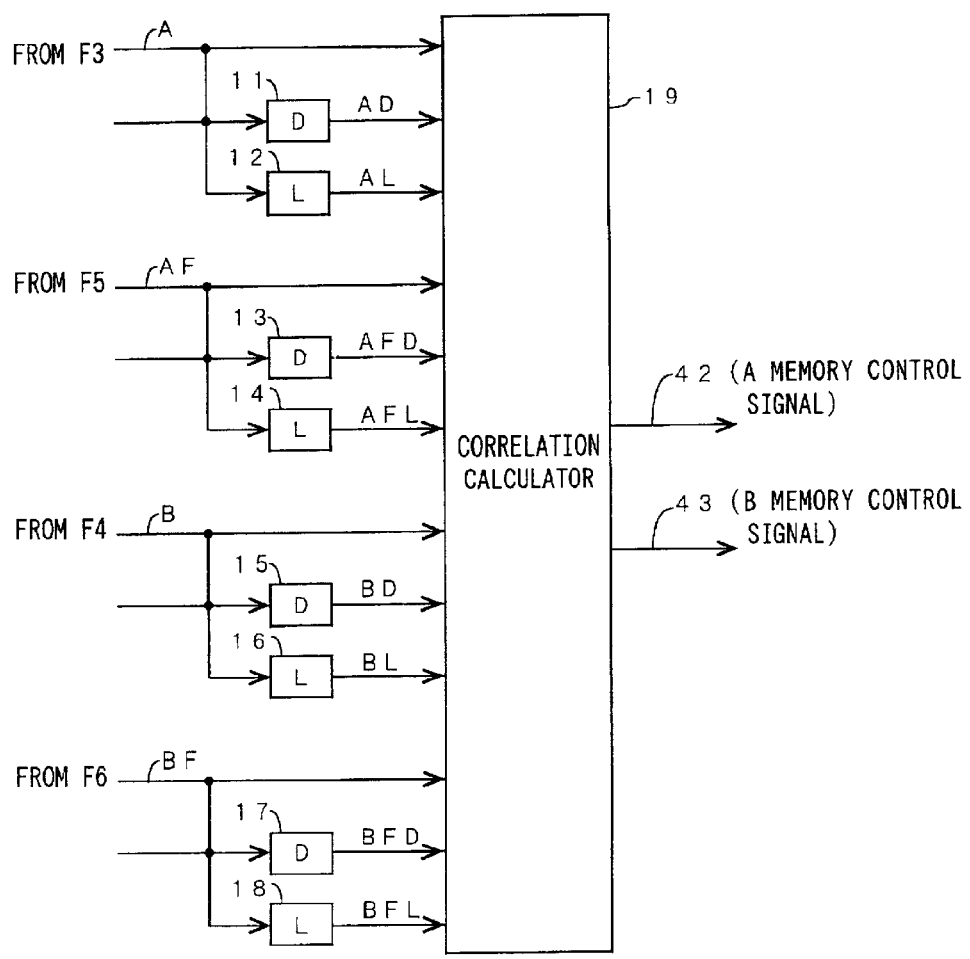
FIG. 2 is a block diagram for illustrating a specific constitution of a comparing portion in FIG. 1.

For example, in the pixel value difference absolute value sum calculator 21, the signals A and B shown in FIG. 2 (namely, pixel values Ai and Bi) are inputted. Therefore, the pixel value difference absolute value sum calculator 21 obtains a pixel value difference absolute value sum SO by the following calculation.

$$SO = \sum_{i=1}^{N} |Ai - Bi|$$

Where, N represents the number of pixels in one screen.

And so forth, the pixel value difference absolute value sum calculators 21 to 35 obtain pixel value difference absolute value sums S1 to S14 from the combinations of the signals (A, AD, AL, AF, AFD, AFL) and the signals (B, BD, BL, BF, BFD, BFL). Then, the fifteen output signals SO to S14 of these pixel value difference absolute value sum calculators 21 to 35 are inputted in the minimum value comparator 40. The minimum value comparator 40 obtains the minimum value from these output signals S0 to S14 and notifies the decoder 41 of one of a terminal numbers (indexes) 0 to 14 having the minimum value as its output R. For example, the decoder 41 has a table as shown in FIG. 4 to show by which directed correction a difference between the two-route videos becomes smaller. By referring to the table, the terminal numbers 0 to 14 such that the SAD becomes the minimum value are converted into A and B memory control signals. For example, if the terminal number "1" is the minimum value, a control signal 43 to delay the B memory by "D (=one pixel)" is outputted from the decoder 41. Alternatively, when this terminal number "1" is the minimum value, the B route is advanced compared to the A route by one pixel.

If a A memory control signal 42 or a B memory control signal 43 is outputted from the decoder 41, the delay amount of the first or second FIFO-type frame memory 1 or 2 (refer to FIG. 1) is controlled by these control signals 42 and 43. For example, if the control signal 43 to delay the B memory by "D (=one pixel)" is outputted from the decoder 41, the second FIFO-type frame memory 2 increases the delay amount by one pixel. Therefore, the difference of the A and B route is corrected so that the correlation becomes higher.

In response to repetition of the above described processing, the delay amount of the first FIFO-type frame memory 1 or the second FIFO-type frame memory 2 is controlled. Therefore, the positional difference or the delay difference of the videos between the A route and the B route is gradually corrected so that the correlation becomes higher. Finally, the present positional difference or the delay difference (i.e., the horizontal difference, the vertical difference and the time axis difference) is completely corrected. In other words, the correcting processing is repeated until the both of the A memory control signal 42 and the B memory control signal 43 become 0, namely, R=0. Then, if the both of the A memory control signal 42 and the B memory control signal 43 become 0, the present correcting processing is terminated. Additionally, the horizontal difference means the pixel difference, the vertical difference means the line difference and the time axis difference means the frame difference, respectively.

As a result, there is no positional difference in the output 44 of the first FIFO-type frame memory 1 or the output 45 of the second FIFO-type frame memory 2 (refer to FIG. 1). For example, these outputs 44 and 45 may be used as an input image signal of an image failure detecting apparatus described in Japanese Patent Application NO. 11-156432 filled by the present applicant.

An alternative specific embodiment of the correlation calculator 19 will be explained with reference to FIGS. 5A and 5B. The specific embodiment is characterized in that difference absolute value sum calculators (SAD) 51 to 65 are provided and further, image quality characteristic value calculators 51a, 51b to 65a and 65b are provided at a previous stage of the difference absolute value sum calculators (SAD) 51 to 65. The same reference numerals as those in FIG. 3 denote the same or the equivalent components as those in FIG. 3, so that the operational explanation thereof is herein omitted.

Each of the image quality characteristic value calculators 51a, 51b to 65a and 65b calculates the image quality characteristic value in each block (for example, 16 pixels×16 lines), which is formed by dividing the screens of the A route and the B route into blocks. As an example of the image quality characteristic value, an average value of a pixel value in a block and a dispersion value of the pixel value in a block may be cited. The difference absolute value sum calculators (SAD) 51 to 65 calculate a sum of the difference absolute values of the image quality characteristic values in the A and B routes. In other words, one difference absolute value is obtained for each block, so that each of the difference absolute value sum calculators (SAD) 51 to 65 sums up the difference absolute values in a whole screen. As the difference absolute value is smaller, the correlation of the videos of the A and B routes is larger.

Figure 6:
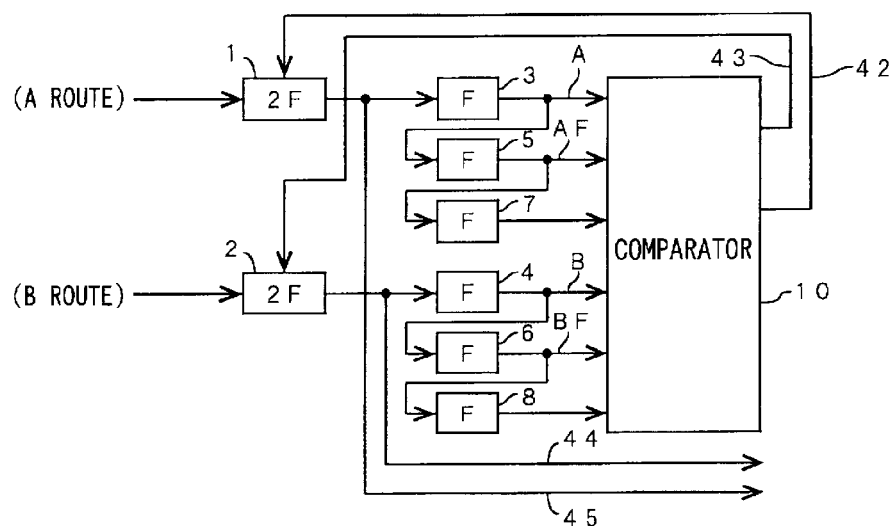
FIG. 6 is a block diagram for illustrating a schematic constitution of a second embodiment according to the present invention.

A second embodiment according to the present invention will be explained with reference to FIG. 6. Compared to the first embodiment (FIG. 1), the embodiment is characterized in that a seventh frame memory 7 and an eighth frame memory 8 are further connected to the rear stages of the fifth frame memory 5 and the sixth frame memory 6, respectively, makes signals which are further delayed by one frame than the first embodiment to provide these signals to the comparator 10. According to the embodiment, the number of parts of a circuit is increased, however, it becomes possible to correct the positional difference of the videos of the A route and the B route at a higher speed.

Figure 7:
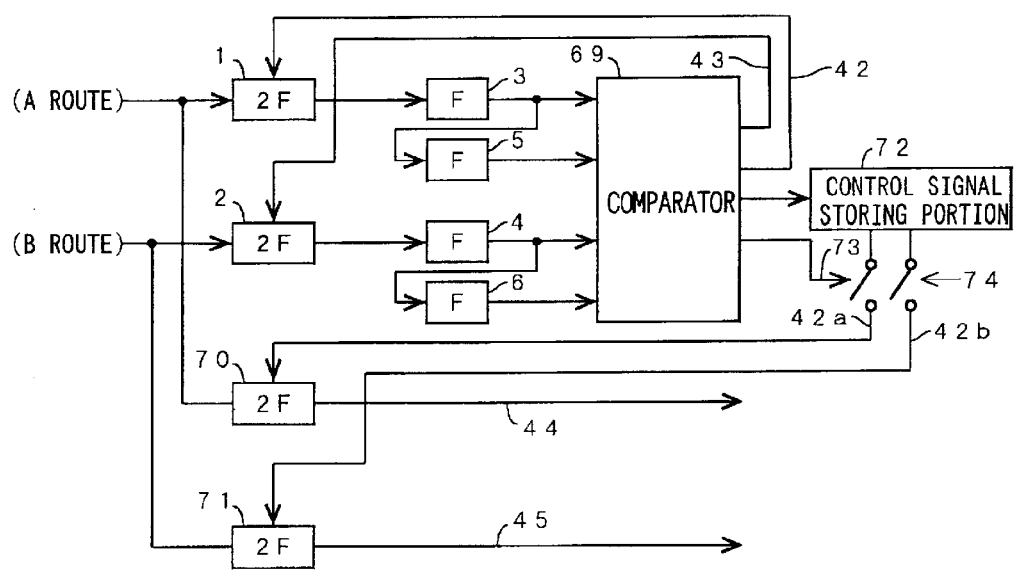
FIG. 7 is a block diagram for illustrating a schematic constitution of a third embodiment according to the present invention.

A third embodiment according to the present invention will be explained with reference to FIG. 7. The embodiment is characterized in that a third FIFO-type frame memory 70 and a fourth FIFO-type frame memory 71 are provided in a circuit in parallel with the first FIFO-type frame memory 1 and the second FIFO-type frame memory 2 and the positional difference of videos is corrected by these third and fourth FIFO-type frame memories 70 and 71 after the correcting amount of the positional difference of the videos by the first and second FIFO-type frame memories 1 and 2 is finally decided. The same reference numerals as those in FIG. 1 denote the same or the equivalent components as those in FIG. 1.

A control signal storing portion 72 stores the A memory control signal 42 and the B memory control signal 43 while the positional difference of the videos has been corrected by using the first and second FIFO-type frame memories 1 and 2. When a correction completion signal 73 (namely, a signal such that both of the A memory control signals 42 and 43 are 0) is outputted from a comparator 69, a switch 74 is closed and a A memory control signal 42a and a B memory control signal 42b, which have been stored in the control signal storing portion 72, are transmitted in gross to the third and the fourth FIFO-type frame memories 70 and 71.

Figure 8:
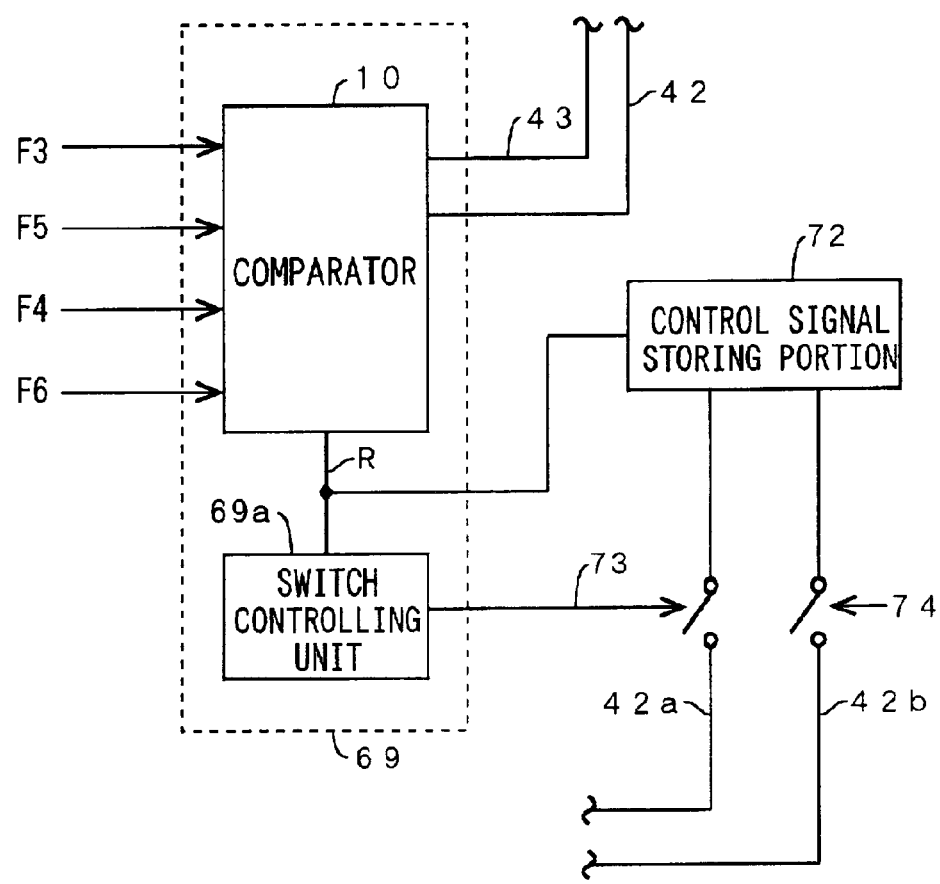
FIG. 8 is a block diagram for illustrating a specific constitution of a comparing portion of the third embodiment according to the present invention.

A specific embodiment of the comparator 69 will be explained with reference to FIG. 8. The comparator 69 is configured by a comparator 10 and a switch controlling unit 69a. Additionally, the comparator unit 10 has the same constitution of that shown in FIG. 2. The output R from the comparator 10 (the output R from the minimum value comparator 40) is inputted in the control signal storing portion 72 and the switch controlling unit 69a. The control signal storing portion 72 detects the final correcting amount of the positional difference of the videos by updating the data whenever the output R is inputted. If the switch controlling unit 69a receives the final correcting amount of the positional difference of the videos (for example, R=0), the correction completion signal 73 is outputted and the switch 74 is closed to send the A and B memory control signals 42a and 42b to the third and fourth FIFO-type frame memories.

According to the present embodiment, it is possible to output the video of which positional difference is completely corrected as outputs 44 and 45 from a time when the positional difference of the videos in the A route and the B route have been completely corrected.

As being obvious from the above described explanation, according to the present invention, even when there is a positional difference of the videos or a delay difference of the videos by the transmission processing delay (a horizontal difference, a vertical difference and a time axial difference) between the received videos in two routes, by repeating the correcting processing of the positional difference or the delay difference, finally, it becomes possible to completely correct these differences. Alternatively, according to the present invention, it is possible to perform the correcting processing by using a memory having a small amount.

What is claimed is:

1. A positional difference correcting apparatus between two-route videos comprising:

first variable delay means in which a received video of a first route is inputted and second variable delay means in which a received video of a second route is inputted;

frame memories, line memories and pixel memories, which are connected to each of the first and second variable delay means, comparing means to compare a frame delay video, a line delay video and a pixel delay video, which are delayed by the frame memories, the line memories and the pixel memories, between the first and second routes; and correcting control signal generating means to generate a control signal for correcting a delay difference, which is obtained by the comparing means;

wherein a signal obtained by the correcting control signal generating means is provided to the first or the second variable delay means so as to correct the delay difference by repeated processing including when an original amount of the delay difference is larger than a frame delay.

2. A positional difference correcting apparatus between two-route videos according to claim 1, wherein N number (N is a positive integer) of the frame memories are connected in series to generate 1 to N frame delay videos as well as the line memories and the pixel memories are connected in parallel with respective frame memories to generate line delay videos and pixel delay videos with respective to said 1 to N frame delay videos so that the frame delay videos, the line delay videos and the pixel delay videos are inputted in the comparing means.

3. A positional difference correcting apparatus between two-route videos according to claim 1, the comparing means comprises correlation calculating means to obtain correlation values of the frame delay video, the line delay video and the pixel delay video, and wherein the delay difference between the two videos with the largest correlation value, is determined minimum delay.

4. A positional difference correcting apparatus between two-route videos according to claim 2, the comparing means comprises correlation calculating means to obtain correlation values of the frame delay video, the line delay video, wherein the delay difference between the two videos with the largest correlation value, is determined as the current minimum delay.

5. A positional difference correcting apparatus between two-route videos according to claim 3, wherein the correlation calculating means calculates the sum of the image value difference absolute values of the videos.

6. A positional difference correcting apparatus between two-route videos according to claim 3, wherein the correlation calculating means calculates the image quality characteristic value of the video.

7. A positional difference correcting apparatus between two-route videos according to claim 6, wherein a screen of the received video of the first and second routes are divided into blocks, and wherein the correlation calculating means calculates the characteristic values of the videos between the first and second routes for each of the blocks and obtains the difference between these characteristic values of respective routes so as to obtain the correlation between the videos.

8. A positional difference correcting apparatus between two-route videos according to claim 7, wherein the characteristic value is at least one of an average value of the pixel values in a block and a dispersion value thereof.

9. A positional difference correcting apparatus between two-route videos according to claim 1, wherein a third variable delay means and a fourth variable delay means are provided in parallel with the first and second variable delay means with respect to the received videos of the first and second routes and a control signal, in which the delay difference is finally corrected by using the first and second variable delay means, is provided to the third and fourth variable delay means, so that the received video, of which or the delay difference is corrected, is outputted.

* * * * *